(12) United States Patent
Tumuluru

(10) Patent No.: US 11,593,840 B2
(45) Date of Patent: Feb. 28, 2023

(54) CLIENT DRIVEN CLIENT STEERING

(71) Applicant: ARRIS Enterprises LLC, Suwanee, GA (US)

(72) Inventor: Sundar Murthy Tumuluru, Karnataka (IN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 17/339,175

(22) Filed: Jun. 4, 2021

(65) Prior Publication Data

US 2022/0020060 A1    Jan. 20, 2022

Related U.S. Application Data

(60) Provisional application No. 63/053,236, filed on Jul. 17, 2020.

(51) Int. Cl.
*G06Q 30/02* (2012.01)
*H04W 84/18* (2009.01)
(Continued)

(52) U.S. Cl.
CPC ..... *G06Q 30/0261* (2013.01); *G06Q 30/0267* (2013.01); *H04W 84/18* (2013.01); *H04W 28/18* (2013.01)

(58) Field of Classification Search
CPC .......... G06Q 30/0261; G06Q 30/0267; H04W 84/18; H04W 28/18; H04W 48/18; H04W 84/12

See application file for complete search history.

(56) References Cited

U.S. PATENT DOCUMENTS 10,728,899 B2 * 7/2020 Backholm ............. H04L 67/289
2012/0243474 A1 * 9/2012 Iyer ..................... H04L 63/1466
370/328

(Continued)

OTHER PUBLICATIONS

Optimize the delivery & management of Wi-Fi, triple-play & the connected home, May 29, 2017, commscope, https://www.commscope.com/product-type/broadband-access-network-systems/network-customer-experience-management/home-network-management/ (Year: 2017).*

(Continued)

*Primary Examiner* — Dipen M Patel
(74) *Attorney, Agent, or Firm* — Wenderoth, Lind & Ponack, L.L.P.

(57) ABSTRACT

Aspects of the present disclosure are drawn to a client device for use with a first APD and a HNC. The first APD and HNC provide a wireless local area network for the client device and access to an external network to the client device. The client device includes a memory and a processor, which is configured to execute instructions stored on the memory. These instructions allow client device to: access the external network via the WLAN by way of the first access point device to perform a function; determine a steering opportunity for steering said client device based on the performance of the function; transmit a steering opportunity signal, based on the determined steering opportunity, to the home network controller; receive a steering request to steer said client device at a steering time based on the steering opportunity; and transmit a steering response honoring the received steering request.

31 Claims, 10 Drawing Sheets

(51) Int. Cl.
*G06Q 30/0251* (2023.01)
*H04W 28/18* (2009.01)

(56) References Cited

U.S. PATENT DOCUMENTS

| | | | | |
|---|---|---|---|---|
| 2013/0259005 | A1* | 10/2013 | Kulkarni | H04W 48/02 370/332 |
| 2014/0059218 | A1* | 2/2014 | Ganu | H04B 17/318 709/224 |
| 2015/0120930 | A1* | 4/2015 | Kamthe | H04W 48/20 709/226 |
| 2015/0341812 | A1* | 11/2015 | Dion | H04N 21/6373 370/252 |
| 2016/0249267 | A1* | 8/2016 | Ho | H04W 48/20 |
| 2017/0111854 | A1* | 4/2017 | Ho | H04B 7/14 |
| 2017/0273013 | A1* | 9/2017 | Edara | H04W 36/22 |
| 2018/0027440 | A1* | 1/2018 | Sun | H04L 61/4541 370/236 |
| 2018/0152861 | A1* | 5/2018 | Giraldo Rodriguez | H04W 16/22 |
| 2018/0279192 | A1* | 9/2018 | Raissinia | H04W 48/20 |
| 2018/0352493 | A1* | 12/2018 | Strater | H04W 36/08 |
| 2018/0352497 | A1* | 12/2018 | Taskin | H04W 36/08 |
| 2020/0107224 | A1* | 4/2020 | Kamath | H04W 76/15 |
| 2021/0120454 | A1* | 4/2021 | Chennichetty | H04B 7/0452 |
| 2021/0176185 | A1* | 6/2021 | Deek | H04L 65/80 |

OTHER PUBLICATIONS

Owen Williams, "How to Build the Speedy Home Wi-Fi Network of Your Dreams", Mar. 11, 2020, https://onezero.medium.com/how-to-build-the-speedy-home-wi-fi-network-of-your-dreams-489dece25480 (Year: 2020).*

Building a better Wi-Fi network, Dec. 6, 2019, homenet howto, https://www.homenethowto.com/wireless/building-a-better-wi-fi-network/ (Year: 2019).*

B. Dezfouli, V. Esmaeelzadeh, J. Sheth and M. Radi, "A Review of Software-Defined WLANs: Architectures and Central Control Mechanisms," in IEEE Communications Surveys & Tutorials, vol. 21, No. 1, pp. 431-463, Firstquarter 2019, doi: 10.1109/COMST.2018. 2868692. (Year: 2019).*

Jaehyuk Choi and Kang G. Shin, QoS provisioning for large-scale multi-ap WLANs, Ad Hoc Networks, vol. 10, Issue 2, Mar. 2012, pp. 174-185, ISSN 1570-8705, https://doi.org/10.1016/j.adhoc.2010. 07.009. (https://www.sciencedirect.com/science/article/pii/S1570870510000880) (Year: 2012).*

Understanding the Network Terms SSID, BSSID, and ESSID, Oct. 5, 2018, Juniper Networks, https://www.juniper.net/documentation/en_US/junos-space-apps/network-director4.0/topics/concept/wireless-ssid-bssid-essid.html#jd0e46 (Year: 2018).*

V. Singh, S. Revathi and V. N. V. Murthy, "Boosting up the performance of Wi-Fi by improving throughput," 2019 International Conference on Vision Towards Emerging Trends in Communication and Networking (ViTECoN), 2019, pp. 1-6, doi: 10.1109/ViTECoN. 2019.8899673. (Year: 2019).*

* cited by examiner

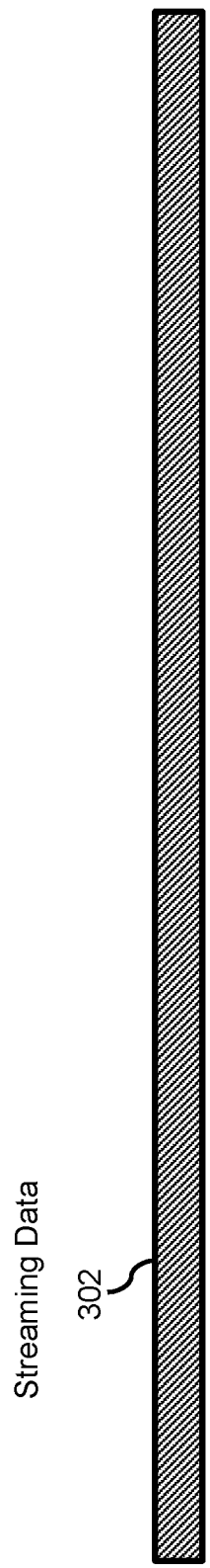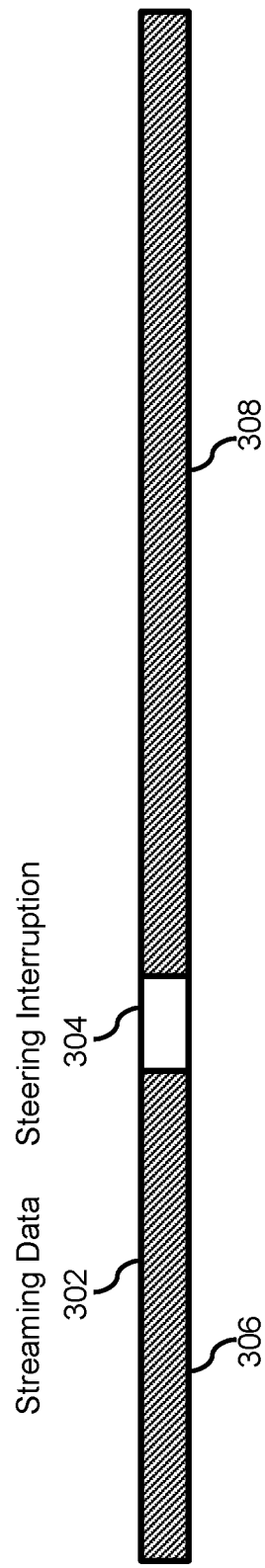

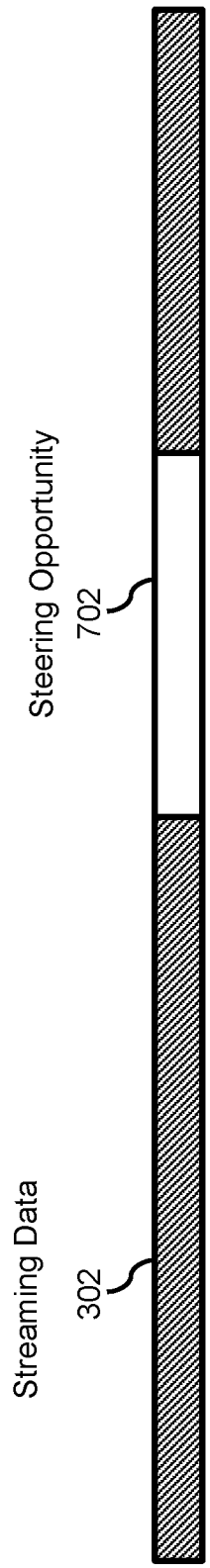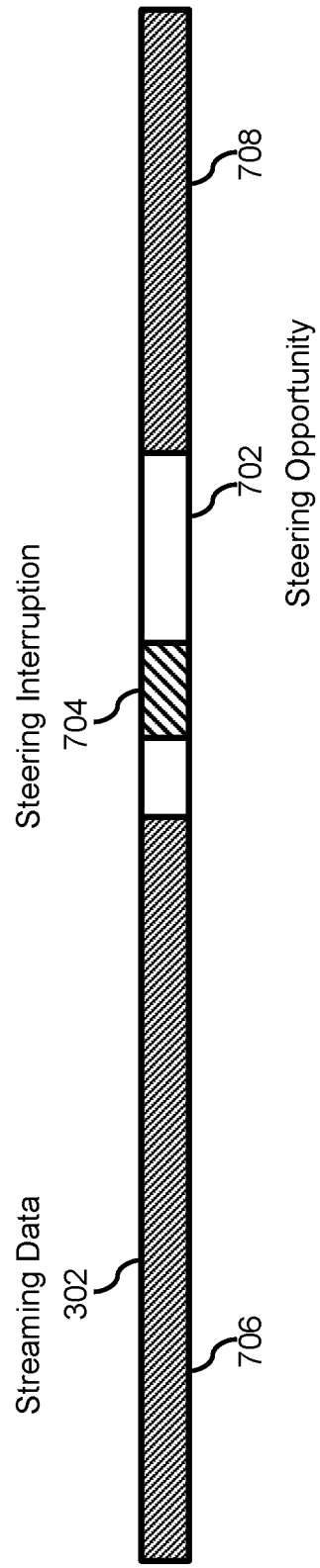

CLIENT DRIVEN CLIENT STEERING

BACKGROUND

Embodiments of the present disclosure relate to Wi-Fi client steering.

SUMMARY

Aspects of the present disclosure are drawn to a client device for use with a first access point device (APD) and a home network controller (HNC) device. The first APD and the HNC device provide a wireless local area network for the client device and provide access to an external network to the client device. The client device includes a memory and a processor. The processor is configured to execute instructions stored on the memory to cause the client device to: access the external network via the wireless local area network by way of the first APD to perform a function; determine a steering opportunity for steering the client device based on the performance of the function; transmit a steering opportunity signal, based on the determined steering opportunity, to the HNC; receive a steering request to steer the client device at a steering time based on the steering opportunity; and transmit a steering response honoring the received steering request.

In some embodiments, the processor is further configured to execute instructions stored on the memory to cause the client device to receive a poll for the steering opportunity signal from the HNC device. The processor is further configured to execute instructions stored on the memory to cause the client device to transmit the steering opportunity signal to the HNC in response to receipt of the poll.

In some embodiments, the processor is further configured to execute instructions stored on the memory to cause the client device to receive a steering request signal from the HNC device. The processor is further configured to execute instructions stored on the memory to cause the client device to transmit the steering opportunity signal to the HNC in response to receipt of the steering request signal.

In some embodiments, the processor is further configured to execute instructions stored on the memory to cause the client device to access the external network via the wireless local area network by way of the first APD to receive content, to buffer a portion of the received content into a cache and to play the buffered content as the performance of the function. The steering opportunity is determined based on a time associated with the buffered content.

In some embodiments, the processor is further configured to execute instructions stored on the memory to cause the client device to access the external network via the wireless local area network by way of the first APD to receive content including an advertisement and to play the received content. The steering opportunity is determined based on a time associated with the advertisement. In some of these embodiments, the first transmission band is a transmission band being transmitted by the first APD, and the second transmission band is a transmission band being transmitted by a second APD.

Aspects of the present disclosure are drawn to a method of using a client device with a first APD and a HNC device. The first APD and the HNC device provide a wireless local area network for the client device and provide access to an external network to the client device. The method includes: access, via a processor configured to execute instructions stored on a memory, the external network via the wireless local area network by way of the first APD to perform a function; determine, via the processor, a steering opportunity for steering the client device based on the performance of the function; transmit, via the processor, a steering opportunity signal, based on the determined steering opportunity, to the HNC; receive, via the processor, a steering request to steer the client device at a steering time based on the steering opportunity; and transmit, via the processor, a steering response honoring the received steering request.

In some embodiments, the method further includes receiving, via the processor and from the HNC device, a poll for the steering opportunity signal, wherein transmitting of the steering opportunity signal includes transmitting the steering opportunity signal, based on the determined steering opportunity, to the HNC in response to receipt of the poll.

In some embodiments, the method further includes receiving, via the processor, a steering request signal from the HNC device, wherein transmitting the steering opportunity signal includes transmitting the steering opportunity signal, based on the determined steering opportunity, to the HNC in response to receipt of the steering request signal.

In some embodiments, the method further includes accessing, via the processor and by way of the first APD to receive content, the external network; buffering, via the processor, a portion of the received content into a cache; and playing, via the processor, the buffered content as the performance of the function, wherein the steering opportunity includes determining the steering opportunity based on a time associated with the buffered content.

In some embodiments, the method further includes accessing, via the processor and via the wireless local area network by way of the first APD, the external network to receive content including an advertisement; and playing, via the processor, the received content. Further, the method determines, via the processor, the steering opportunity includes determining the steering opportunity based on a time associated with the advertisement.

In some embodiments, the method further includes the receiving of the steering request, which includes receiving the steering request as a basic service set steering management steering request, and receiving the steering request as a basic service set steering management steering request includes receiving the basic service set steering management steering request to steer the client device from a first transmission band to a second transmission band. In some of these embodiments, the receiving of the steering request includes receiving the steering request as a basic service set steering management steering request, and the receiving of the steering request as a basic service set steering management steering request includes receiving the basic service set steering management steering request to steer the client device from a first transmission band to a second transmission band.

Aspects of the present disclosure are drawn to a non-transitory, computer-readable media having computer-readable instructions stored thereon, the computer-readable instructions being capable of being read by a client device for use with a first APD and a HNC device, the first APD and the HNC device providing a wireless local area network for the client device and providing access to an external network to the client device, the computer-readable instructions are capable of instructing the client device to perform the method. The method includes: accessing, via a processor configured to execute instructions stored on a memory, the external network via the wireless local area network by way of the first APD to perform a function; determining, via the processor, a steering opportunity for steering the client device based on the performance of the function; transmitting, via the processor, a steering opportunity signal, based on the determined steering opportunity, to the HNC; receiving, via the processor, a steering request to steer the client device at a steering time based on the steering opportunity; and transmitting, via the processor, a steering response honoring the received steering request.

In some embodiments, the computer-readable instructions are capable of instructing the client device to perform the method which includes: receiving, via the processor and from the HNC device, a poll for the steering opportunity signal, wherein transmitting the steering opportunity signal includes transmitting the steering opportunity signal, based on the determined steering opportunity, to the HNC in response to receipt of the poll.

In some embodiments, the computer-readable instructions are capable of instructing the client device to perform the method which includes: receiving, via the processor, a steering request signal from the HNC device, wherein transmitting the steering opportunity signal includes transmitting the steering opportunity signal, based on the determined steering opportunity, to the HNC in response to receipt of the steering request signal.

In some embodiments, the computer-readable instructions are capable of instructing the client device to perform the method which includes: accessing, via the processor and by way of the first APD to receive content, the external network; buffering, via the processor, a portion of the received content into a cache; and playing, via the processor, the buffered content as the performance of the function, wherein the steering opportunity includes determining the steering opportunity based on a time associated with the buffered content.

In some embodiments, the computer-readable instructions are capable of instructing the client device to perform the method which includes: accessing, via the processor and via the wireless local area network by way of the first APD, the external network to receive content including an advertisement; and playing, via the processor, the received content, wherein the steering opportunity includes determining the steering opportunity based on a time associated with the advertisement.

In some embodiments, the computer-readable instructions are capable of instructing the client device to perform the method which includes: receiving the steering request as a basic service set steering management steering request, and receiving the steering request as a basic service set steering management steering request includes receiving the basic service set steering management steering request to steer the client device from a first transmission band to a second transmission band. In some of these embodiments, the computer-readable instructions are capable of instructing the client device to perform the method which includes: the first transmission band being transmitted by the first APD, and the second transmission being transmitted by a second APD.

Aspects of the present disclosure are drawn to a method of using a HNC device with a first APD and a client device, the first APD and the client device being included within a wireless local area network. The method includes: permitting access, via a processor configured to execute instructions stored on a memory, for the client device to the external network via the wireless local area network by way of the first APD to perform a function; receiving, via the processor and from the client device by way of the first APD, a steering opportunity signal for steering the client device based on the performance of the function; transmitting, via the processor and to the client device by way of the first APD, a steering request to steer the client device at a steering time based on the steering opportunity; receiving, via the processor and from the client device by way of the first APD, a steering response honoring the steering request; and transmitting, via the processor and to the client device by way of the first APD, a steering instruction to steer the client device based on the steering opportunity.

In some embodiments, the method also includes transmitting, via the processor and to the client device by way of the first APD, a poll for the steering opportunity signal, wherein the receiving the steering opportunity signal includes receiving the steering opportunity signal, based on the determined steering opportunity, from the client device in response to receipt of the poll.

In some embodiments, the method also includes transmitting, via the processor and to the client device by way of the first APD, a steering request signal, wherein the receiving the steering opportunity signal includes receiving the steering opportunity signal, based on the determined steering opportunity, from the client device in response to receipt of the steering request signal.

In some embodiments, the method also includes transmitting the steering request as a basic service set steering management steering request, and transmitting the steering request includes transmitting the basic service set steering management steering request to steer the client device from a first transmission band to a second transmission band. In some of these embodiments, the first transmission band transmitted by the first APD, and the second transmission band transmitted by a second APD.

Aspects of the present disclosure are drawn to a HNC device for use with a first APD and a client device, with the first APD and the client device being included within a wireless local area network. The HNC device includes a memory and a processor, configured to execute instructions stored on the memory to cause the home network device to: permit access for the client device to the external network via the wireless local area network by way of the first APD to perform a function; receive, from the client device by way of the first APD, a steering opportunity signal for steering the client device based on the performance of the function; transmit, to the client device by way of the first APD, a steering request to steer the client device at a steering time based on the steering opportunity; receive, from the client device by way of the first APD, a steering response honoring the received steering request; and transmit, to the client device by way of the first APD, a steering instruction to steer the client device based on the steering opportunity.

In some embodiments, the processor is further configured to execute instructions stored on the memory to cause the HNC device to: transmit, to the client device by way of the first APD, a poll for the steering opportunity signal; and transmit, to the client device by way of the first APD, a steering instruction to steer the client device based on the steering opportunity.

In some embodiments, the processor is further configured to execute instructions stored on the memory to cause the HNC device to: transmit, to the client device by way of the first APD, a steering request signal; and receive the steering opportunity signal, based on the determined steering opportunity, from the client device in response to receipt of the steering request signal.

In some embodiments, the processor is further configured to execute instructions stored on the memory to cause the HNC device to: transmit the steering request as a basic service set steering management steering request; and transmit the basic service set steering management steering request to steer the client device from a first transmission band to a second transmission band. In some of these embodiments, the first transmission band is a transmission band being transmitted by the first APD, and the second transmission band is a transmission band being transmitted by a second APD.

BRIEF SUMMARY OF THE DRAWINGS

The accompanying drawings, which are incorporated in and form a part of the specification, illustrate example embodiments and, together with the description, serve to explain the principles of the present disclosure. In the drawings:

FIG. 3A illustrates a data stream to a client device in the wireless local area network of FIG. 1A;

FIG. 3B illustrates the data stream of FIG. 3A with a steering interruption dispose therein;

FIG. 7A illustrates streaming data having a steering opportunity in accordance with aspects of the present disclosure;

FIG. 7B illustrates the streaming data from FIG. 7A with a steering interruption occurring during the steering opportunity in accordance with aspects of the present disclosure;

DETAILED DESCRIPTION

Figure 1A:
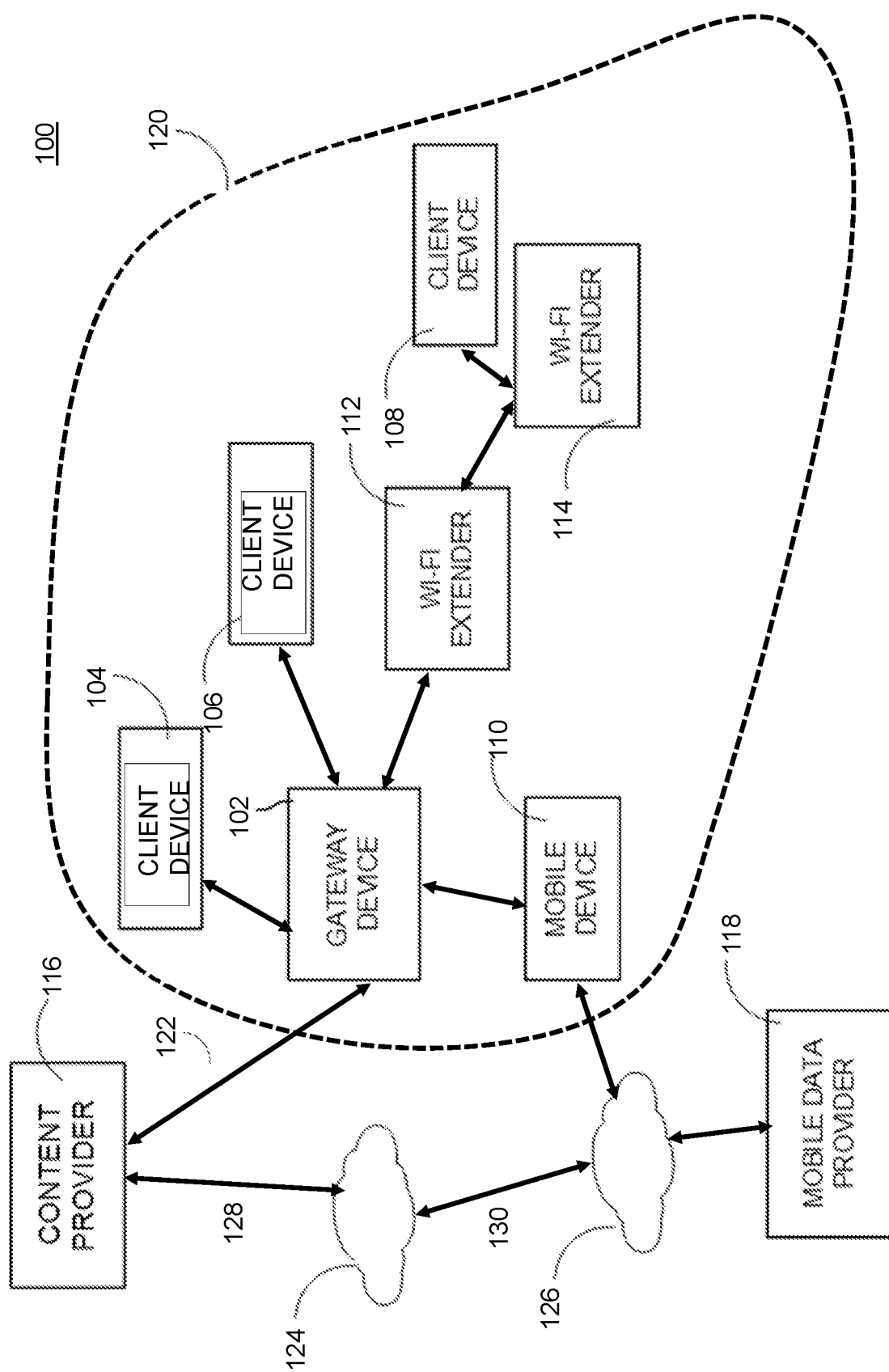
FIG. 1A illustrates structural components implementing an electronic communication network at a time $t_0$.

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

A conventional wireless local area network (WLAN), e.g., Wi-Fi home network, may include multiple devices to address connectivity issues within the home. Extenders may be added to a home network to increase the wireless, e.g., Wi-Fi, coverage area. This kind of environment includes a home network controller (HNC) component, or HNC, running on a device (gateway or extender) within home network to steer clients, such as mobile devices, from one access point to another to provide better connectivity for the client. A device in which the HNC resides is considered an HNC device. Steering a client from one APD to another may be required to efficiently utilize the home network bandwidth.

Within a Wi-Fi network with multiple APD, there are times where the HNC device will determine that a client device should be steered. There are many forms of steering, which include: interchannel steering; interband steering; APD to APD steering.

For interchannel steering or interband steering, the APD monitors its channels, and decides for itself whether or not to move the client device from one channel to another channel—interchannel steering—, or from one radio, e.g., 2.4 GHz band radio, to another radio, e.g., 5 GHz band radio, —interband steering—. In interchannel steering or interband steering, the client device does not have to disassociate from the APD and therefore does not disconnect from the network.

For APD to APD steering, the HNC monitors the network and decides whether to steer a client from one APD to another APD in order to optimize network resources. The HNC will send a steering request to a client to initiate the steering operation. In some cases, the client device will respond to the steering request indicating that it is a willing steering candidate. The steering process may then commence. In order for the client device to steer, the client device must first disassociate from an APD to which the client device is currently associated, thereby disconnecting the client device from the network. Then, the client device may associate with another APD to thereby reconnect to the network.

An example of steering a client from one APD to another APD will be described in further detail with reference to FIGS. 1A-3B.

FIG. 1A illustrates structural components implementing an electronic communication network 100.

As shown in the figure, electronic communication network 100 includes: a gateway device 102; a plurality of client devices, a sample of which are illustrated as a client device 104, a client device 106 and a client device 108; a mobile device 110; a plurality of Wi-Fi extenders, a sample of which are illustrated as a Wi-Fi extender 112 and a Wi-Fi extender 114; a content provider 116; a mobile data provider 118; a wireless local area network (WLAN) 120; physical media/wiring 122; an external network 124, e.g., the Internet; and a wireless network 126; communication channel 128 and 130, e.g., anything wired or wireless.

An APD is a networking hardware device that allows other devices to connect to a wired network. Gateway device 102, Wi-Fi extender 112, and Wi-Fi extender 114 are all APDs.

A gateway device, also referred to as a gateway, residential gateway, or RG, is an electronic device that is to be located so as to establish a local area network (LAN) at a consumer premises. The consumer premises can include a residential dwelling, office, or any other business space of a user. The terms home, office, and premises may be used synonymously herein.

Gateway device 102 may be any device or system that is operable to allow data to flow from one discrete network to another, which in this example is from WLAN 120 in FIG.

1A to external network 124, e.g., the Internet. Gateway device 102 may perform such functions as web acceleration and HTTP compression, flow control, encryption, redundancy switchovers, traffic restriction policy enforcement, data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing.

Gateway device 102 establishes, or is part of, WLAN 120, using Wi-Fi for example, such that client devices 104, 106, 108, mobile device 110 and Wi-Fi extenders 112 and 114 are able to communicate wirelessly with gateway device 102. In particular, gateway device 102 is able to communicate wirelessly directly with client devices 104, 106, mobile device 110 and Wi-Fi extender 112. Further, gateway device 102 is able to communicate wirelessly with Wi-Fi extender 114 via Wi-Fi extender 112 and is able to communicate wirelessly with client device 108 via Wi-Fi extender 112 and Wi-Fi extender 114. The term Wi-Fi as used herein may be considered to refer to any of Wi-Fi 4, 5, 6, 6E, or any variation thereof.

Further, it should be noted that gateway device 102 is able to communicate with content provider 116 via physical media/wiring 122, which may optionally be a wireless communication system, such as 4G, or 5G, and further is able to connect to external network 124, e.g., the Internet, via content provider 116.

Content provider 116 includes head-end equipment such as server computers (e.g., automatic configuration server ACS, cable modem termination system CMTS) that enable a content provider, such as a cable television provider, a satellite television provider, an internet service provider, or multiple-systems operator (MSO), to provide content (such as audio/video content and/or internet service) either through physical media/wiring 122, such as a coaxial network, an optical fiber network, and/or DSL, or wireless network 124, such as a satellite or terrestrial antenna implemented network or a combination of any of these examples or their equivalents. The data communicated on such network can be implemented using a variety of protocols on a network such as a wide area network (WAN), a virtual private network (VPN), metropolitan area networks (MANs), system area networks (SANs), a DOC SIS network, a fiber optics network (e.g., FTTH (fiber to the home), FTTX (fiber to the X), or hybrid fiber-coaxial (HFC)), a digital subscriber line (DSL), a public switched data network (PSDN), a global Telex network, or a 2G, 3G, 4G or 5G, for example.

Gateway device 102 serves as a gateway or APD to external network 124, e.g., the Internet (or otherwise as mentioned above), for one or more electronic devices, referred to generally herein as client devices 104, 106, 108 and mobile device 110 that wirelessly communicate with gateway device 102 via, e.g., Wi-Fi. Client devices 104, 106, 108 and mobile device 110 can be desk top computers, laptop computers, electronic tablet devices, smart phones, appliances, or any other so called internet of things equipped devices that are equipped to communicate information via WLAN 120.

Wi-Fi extenders 112 and 114 can be paired with gateway device 102 in order to communicate wirelessly with gateway device 102 and extend the coverage area of WLAN 120. Any of the client devices 104, 106, 108 and mobile device 110 can be in communication with gateway device 102 or any of Wi-Fi extenders 112 and 114. Mobile device 110 can also have a wireless data communication via wireless network 126 e.g., 3G, LTE, 4G, 5G, etc., with a mobile data provider 118.

Gateway device 102 has the capability of wirelessly communicating with plural electronic user devices over respective communication avenues. In order to extend the area in which WLAN 120 is effective, beyond the radio reach of gateway device 102, one or more extenders, e.g., one or more of Wi-Fi extenders 112 and 114, can be added. The establishment of the operative communications between a Wi-Fi extender 112 and gateway device 102 (or between Wi-Fi extender 114 and an already established Wi-Fi extender 112) is referred to as onboarding the extender. The Wi-Fi extenders 112 and 114 can communicate wirelessly with gateway device 102. However, rather than using one of the communication avenues that are allocated for communication with user devices, a dedicated avenue of communication may be established, at least at some times, between the extender and gateway device 102. This dedicated avenue is referred to as a backhaul.

Within WLAN 120, electronic devices are often referred to as being clients in WLAN 120. In IEEE 802.11 (Wi-Fi) terminology, a station (abbreviated as STA) is a device that has the capability to use the 802.11 protocol. For example, a station may be a laptop, a desktop PC, PDA, APD or Wi-Fi phone. An STA may be fixed, mobile or portable. Generally in wireless networking terminology, a client, wireless client, and node are often used interchangeably, with no strict distinction existing between these terms. A client may also be referred to as a transmitter or receiver based on its transmission characteristics. IEEE 802.11-2012 defines client as: a logical entity that is a singly addressable instance of a medium access control (MAC) and physical layer (PHY) interface to the wireless medium (WM).

A wireless APD (WAPD), or more generally just APD, is a networking hardware device that allows other Wi-Fi devices to connect to a Wi-Fi network. A service set ID (SSID) is an identification (in IEEE 802.11) that is broadcast by APDs in beacon packets to announce the presence of a network APD for the SSID. SSIDs are customizable IDs that can be zero to 32 bytes, and can be in a natural language, such as English. In WLAN 120, gateway device 102, Wi-Fi extender 112 and Wi-Fi extender 114 are APDs for WLAN 120.

For example, consider the situation where HNC device wants to steer client device 108 from Wi-Fi extender 114 to Wi-Fi extender 112, due to Wi-Fi extender 114 having low signal strength. This will be described with greater detail in reference to FIG. 2.

Figure 2:
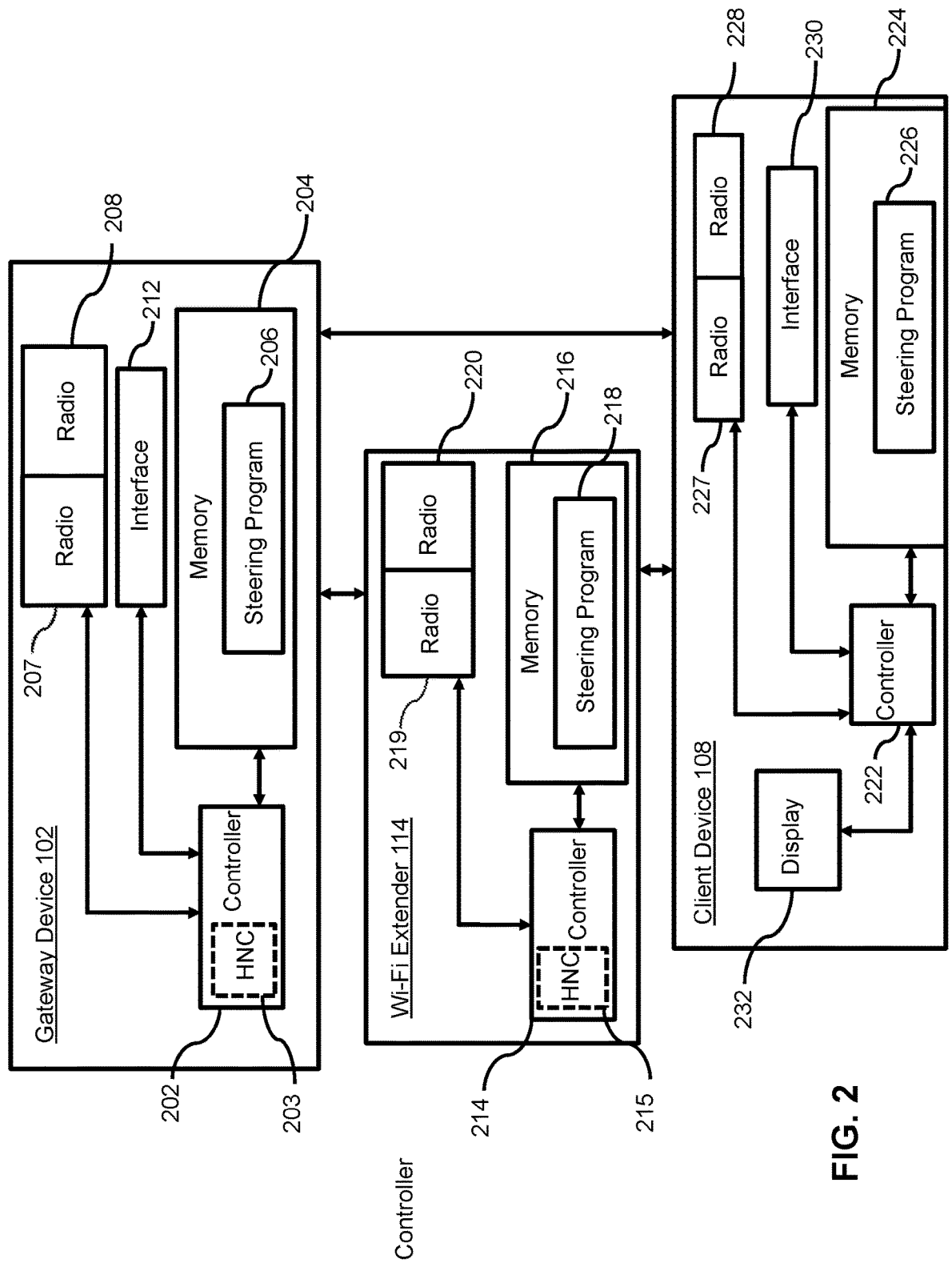
FIG. 2 illustrates an exploded view of the gateway device, a Wi-Fi extender, and a client device of FIGS. 1A-B.

FIG. 2 illustrates an exploded view of gateway device 102, Wi-Fi extender 114, and client device 108 of FIG. 1A.

As shown in FIG. 2, gateway device 102 includes: a controller 202, having a HNC 203 disposed therein; a memory 204, which has stored therein a steering program 206; at least one radio, a sample of which is illustrated as radios 207 and 208; and an interface circuit 212.

In this example, controller 202, memory 204, radios 207 and 208, and interface circuit 212 are illustrated as individual devices. However, in some embodiments, at least two of controller 202, memory 204, radios 207 and 208, and interface circuit 212 may be combined as a unitary device. Whether as individual devices or as combined devices, controller 202, memory 204, radios 207 and 208, and interface circuit 212 may be implemented as any combination of an apparatus, a system and an integrated circuit. Further, in some embodiments, at least one of controller 202, memory 204 and interface circuit 212 may be implemented as a computer having non-transitory computer-readable media for carrying or having computer-executable instructions or data structures stored thereon. Such non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

One or more tangible computer-readable media may be coupled to a processor such that the processor may read information from, and write information to the tangible computer-readable media. In the alternative, the tangible computer-readable media may be integral to the processor. The processor and the tangible computer-readable media may reside in an integrated circuit (IC), an application specific integrated circuit (ASIC), or large scale integrated circuit (LSI), system LSI, super LSI, or ultra LSI components that perform a part or all of the functions described herein. In the alternative, the processor and the tangible computer-readable media may reside as discrete components.

The one or more tangible computer-readable media may be also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

Figure 1B:
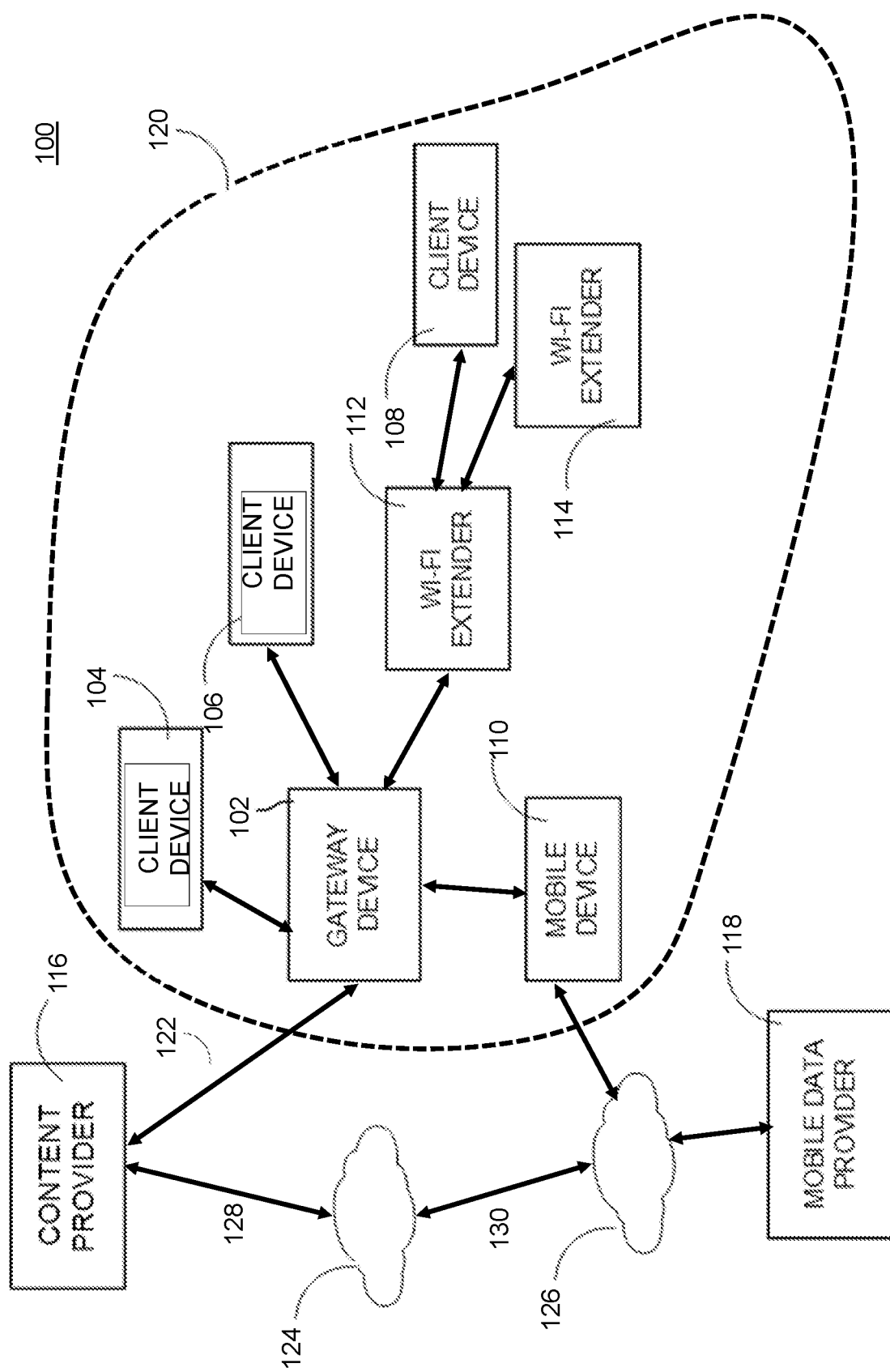
FIG. 1B illustrates structural components implementing the electronic communication network of FIG. 1A at time $t_1$.

Controller 202 can include hardware circuitry such as a dedicated control circuit, CPU, microprocessor, etc. Controller 202 controls the circuits of gateway device 102. Memory 204 can store various programming, and user content, and data. Interface circuit 212 can include one or more connectors, such as RF connectors, or Ethernet connectors, and/or wireless communication circuitry, such as 5G circuitry and one or more antennas. Interface circuit 212 receives content from content provider 116 (as shown in FIGS. 1A and 1B) by known methods, non-limiting examples of which include terrestrial antenna, satellite dish, wired cable, DSL, optical fibers, or 5G as discussed above. Through interface circuit 212, gateway device 102 receives an input signal, including data and/or audio/video content, from content provider 116 and can send data to content provider 116.

Radios 207 and 208 may also be referred to as a wireless communication circuit, such as a Wi-Fi WLAN interface radio transceiver and is operable to communicate with client devices 104, 106 and 108, with mobile device 110 and with Wi-Fi extenders 112 and 114. Radios 207 and 208 include one or more antennas and communicate wirelessly via one or more of the 2.4 GHz band, the 5 GHz band, and the 6 GHz band, or at the appropriate band and bandwidth to implement the Wi-Fi 4, 5, 6, or 6E protocols. Gateway device 102 can also be equipped with a radio to implement a Bluetooth interface radio transceiver and antenna, which communicates wirelessly in the ISM band, from 2.400 to 2.485 GHz. As an alternative, at least one of the radios can be a radio meeting a Radio Frequency for Consumer Electronics (RF4CE) protocol, zigbee protocol, and/or IEEE802.15.4 protocol, which also communicates in the ISM band.

Wi-Fi extender 114 includes: a controller 214; a memory 216, which has stored therein a steering program 218; and at least one radio, a sample of which is illustrated as radios 219 and 220. It should be noted that additional Wi-Fi extenders, including Wi-Fi extender 112, have similar structure and operation to that of Wi-Fi extender 114. In some cases, Wi-Fi extender 112 may include an optional HNC. Accordingly as shown in the figure, controller 214 of Wi-Fi extender 112 shows an optional HNC 215 as a dotted box.

In this example, controller 214, memory 216 and radios 219 and 220 are illustrated as individual devices. However, in some embodiments, at least two of controller 214, memory 216 and radios 219 and 220 may be combined as a unitary device. Further, in some embodiments, at least one of controller 214 and memory 216 may be implemented as a computer having tangible computer-readable media for carrying or having computer-executable instructions or data structures stored thereon.

Controller 214, which can include hardware circuitry such as a dedicated control circuit, CPU, microprocessor, etc., controls the circuits of Wi-Fi extender 114. Memory 216 can store various programming, and user content, and data. Radios 219 and 220, such as a Wi-Fi WLAN interface radio transceiver, are operable to communicate with client devices 104, 106 and 108, with mobile device 110 and with gateway device 102, as shown in FIGS. 1A and 1B. Radios 219 and 220 both include one or more antennas and communicate wirelessly via one or more of the 2.4 GHz band, the 5 GHz band, and the 6 GHz band, or at the appropriate band and bandwidth to implement any IEEE 802.11 Wi-Fi protocols, such as the Wi-Fi 4, 5, 6, or 6E protocols. Gateway device 102 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands, RF4CE protocol, ZigBee protocol, Z-Wave protocol, or IEEE 802.15.4 protocol.

Any of the Wi-Fi extenders within WLAN 120 may be a Wi-Fi extender similar to Wi-Fi extender 112.

Client device 108 includes: a controller 222; a memory 224, which has stored therein a steering program 226; and at least one radio, a sample of which is illustrated as a radios 227 and 228; an interface 230 and a display 232.

In this example, controller 222, memory 224, radios 227 and 228, interface 230 and display 232 are illustrated as individual devices. However, in some embodiments, at least two of controller 222, memory 224, radios 227 and 228, interface 230 and display 232 may be combined as a unitary device. Further, in some embodiments, at least one of controller 222 and memory 224 may be implemented as a computer having tangible computer-readable media for carrying or having computer-executable instructions or data structures stored thereon.

Controller 222 can include hardware circuitry such as a dedicated control circuit, CPU, a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of the 108. Memory 224 can store various programming, and user content, and data. Radios 227 and 228 may include a Wi-Fi WLAN interface radio transceiver that is operable to communicate with client devices 104, 106 and 108, with Wi-Fi extenders 112 and 114 and with gateway device 102, as shown in FIGS. 1A and 1B; they also may include a cellular transceiver operable to communicate with mobile data provider 118 through wireless network 126. Radios 227 and 228 both include one or more antennas and communicate wirelessly via one or more of the 2.4 GHz band, the 5 GHz band, and the 6 GHz band, or at the appropriate band and bandwidth to implement any IEEE 802.11 Wi-Fi protocols, such as the Wi-Fi 4, 5, 6, or 6E protocols. Wi-Fi extender 112 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands, RF4CE protocol, ZigBee protocol, Z-Wave protocol, or IEEE 802.15.4 protocol.

Any of the client devices within WLAN 120 may be a mobile device similar to mobile device 110. In the event that a client device within WLAN 120 is not a mobile device similar to mobile device 110, such a client device may still include: a controller, which can include hardware circuitry such as a dedicated control circuit, CPU, microprocessor, etc., and that controls the circuits of the client device; a memory, which has stored therein an onboarding program, that is similar to memory 224 and onboarding program 226, respectively, of mobile device 110 discussed above; a radio similar to radios 227 and 228 of client device 108 discussed above; in additional to further functional circuitry. Accordingly, any of the client devices may include a Wi-Fi WLAN interface radio transceiver, that is operable to communicate with other client devices, with Wi-Fi extenders 112 and 14 and with gateway device 102, as shown in FIGS. 1A and 1B and also may include a cellular transceiver operable to communicate with mobile data provider 118 through wireless network 126. Further, any of the client devices may include a radio that is similar to radio 227 or 228 of client device 108 discussed above. Still further, any of the client devices may be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands, RF4CE protocol, ZigBee protocol, Z-Wave protocol, or IEEE 802.15.4 protocol, in a manner similar to client device 108 discussed above.

Insofar as gateway device 102 provides connection to content provider 116, such as an MSO, gateway device 102 can be equipped with connectors to connect with a television or display device, and can also include programming to execute an electronic program guide and/or other suitable graphical user interface (GUI), and can with such configuration be referred to as a so called set top box. Such a set top box can be included in the system shown in FIG. 1 as gateway device 102 or in addition thereto. Moreover, inclusion of one or more of far-field microphones, (for e.g., voice command and/or presence recognition, and/or telephone communication), cameras, (for e.g., gesture and/or presence recognition, and/or video telephone communication), and speakers, and associated programming, can enable the gateway device to be a so called smart media device.

There is only one HNC in every WLAN, so HNC 203 and HNC 215 are both represented by a dotted square to show that they are optional locations of the HNC.

The HNC can reside in any APD, including a gateway device, which can operate as a gateway and a router, such as HNC 203 of gateway device 102. In terms of steering, gateway device 102 may transmit a steering request by way of radio 207 or 208 to radios 219 or 220 of Wi-Fi extender 114. For purposes of discussion, let client device 108 be communicating with Wi-Fi extender 114 via radio 228, let Wi-Fi extender 114 be communicating with client device 108 and with gateway device 102 via radio 220, and let gateway device 102 be communicating with Wi-Fi extender 114 via radio 208, wherein each of radio 228, radio 220, and radio 208 is communicating on a 2.4 GHz channel.

Radio 220 of Wi-Fi extender 114 will then forward the steering request to radio 228 of client device 108. For purposes of this discussion, client device 108 is able to receive and honor the steering request. Client device 108 transmits, via radio 228, a response to the steering request to radio 220 of Wi-Fi extender 114. Radio 220 then transmits the response to the steering request to radio 208 of gateway device 102.

Upon receiving the response to the steering request, which indicates that client device 108 will honor the steering request, HNC 203 may transmit a steering instruction by way of radio 208 to radio 220 of Wi-Fi extender 114. Wi-Fi extender 114 will then forward the steering instruction to radio 228 of client device 108. At that point, client device 108 is steered, e.g., to another channel or to another APD.

A problem with the conventional steering operation is that client device 108 is not informed of when it will be steered. This will be described in greater detail with reference to FIGS. 3A-B.

FIG. 3A illustrates a data stream 302 to client device 108 in WLAN 102. Data stream 302 may be any streaming data, non-limiting examples of which include downloading content, video gameplay, downloading data and uploading data.

From steering instructions from HNC 203, Wi-Fi extender 112 determines that client device 108 is to be steered. Regardless of what client device 108 is doing, Wi-Fi extender 112 will steer client device 108 if client device has positively responded to the steering request. When client device 108 is steered from Wi-Fi extender 112, client device 108 disassociates from Wi-Fi extender 112. Client device 108 will subsequently associate with Wi-Fi extender 114. However, during the time from when client device 108 disassociated from Wi-Fi extender 112 to the time when client device 108 associates with Wi-Fi extender 114, the streaming data 302 is interrupted. This is shown in FIG. 3B.

FIG. 3B illustrates data stream 302 of FIG. 3A with a steering interruption 304 disposed therein. As a result of steering interruption 304, streaming data 302 is broken into data portions 306 and 308.

Eventually, client device 108 does associate with Wi-Fi extender 114 at time $t_1$, as shown in FIG. 1B.

The disassociation of client device 108 during steering may pose a problem if client device 108 is completing a task that requires uninterrupted service. For example, if client device 108 is streaming a video, steering it from Wi-Fi extender 112 to Wi-Fi extender 114 may cause a loss of video or may cause the video to freeze until client device 108 reconnects with WLAN 102. If client device 108 is making a bank transaction, and is steered before the transaction is complete, the transaction might have to be restarted, as the two-way communication between client device 108 and the bank (not shown) are interrupted before the transaction is finalized.

What is needed is a system and method for steering a client while mitigating problems associated with an interruption in service.

A system and method in accordance with the present disclosure provides a way of steering a client while mitigating problems associated with an interruption in service.

In accordance with the present disclosure, an HNC retrieves the data about the extenders and connected clients for steering decisions. An APD keeps track of service availed to a connected client and a steer history of the connected client and determines an optimal time to steer the client based on client's activity and provides information about the steering opportunity to HNC. HNC can use the steering opportunity information to steer client during the steering opportunity. This will allow client's smooth transition from one APD to another without an unwanted interruption in service. In case the steer fails or the client device does not respond to steering request, the HNC can poll for opportunity information. Alternatively, the client can publish the opportunity information when HNC tries to steer the client.

In some embodiments, a client device may: maintain a list of services available on the client device; give priority to each service and maintain delay tolerance for each service (for example, for voice service or skype calls the priority can be high, for video services the delay tolerance depends on the buffer cached at the client, etc.); maintain history of preferred APDs and its connecting time when a steering is triggered; during internet content playback, calculate buffered content playback time and check whether the time is sufficient for steering; find whether an ad is being played (during commercial break) on client in case of live streaming content playback or internet content playback; and publish an opportunity (or upcoming opportunity) for steering to HNC.

An example system and method for steering a client without interrupting their service in accordance with aspects of the present disclosure will now be described in greater detail with reference to FIGS. 4A-7B.

Figure 4A:
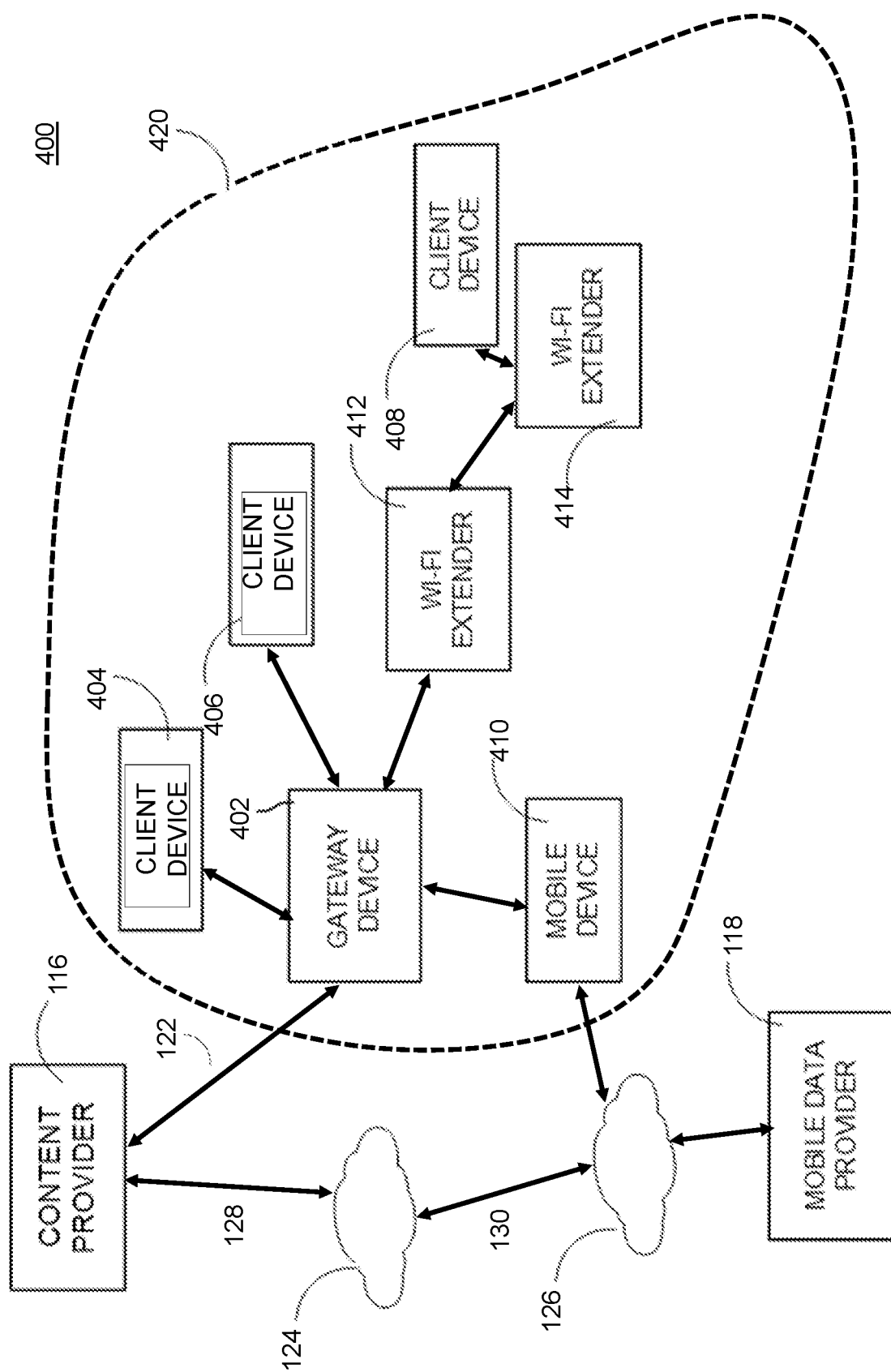
FIG. 4A illustrates a communication system at a time $t_2$ in accordance with aspects of the present disclosure.

FIG. 4A illustrates a communication system 400 at a time $t_2$ in accordance with aspects of the present disclosure.

As shown in the figure, system 400 includes: a gateway device 402; a plurality of client devices, a sample of which are illustrated as a client device 404, a client device 406 and a client device 408; a mobile device 410; a plurality of Wi-Fi extenders, a sample of which are illustrated as a Wi-Fi extender 412 and a Wi-Fi extender 414; and a wireless local area network (WLAN) 420. System 400 also includes content provider 116; mobile data provider 118; physical media/wiring 122; external network 124, e.g., the Internet; wireless network 126; and communication channel 128 and 130, e.g., anything wired or wireless.

For example, consider the situation where HNC wants to steer client device 408 from Wi-Fi extender 414 to Wi-Fi extender 412, due to Wi-Fi extender 414 having low signal strength. This will be described with greater detail in reference to FIG. 6.

Figure 4B:
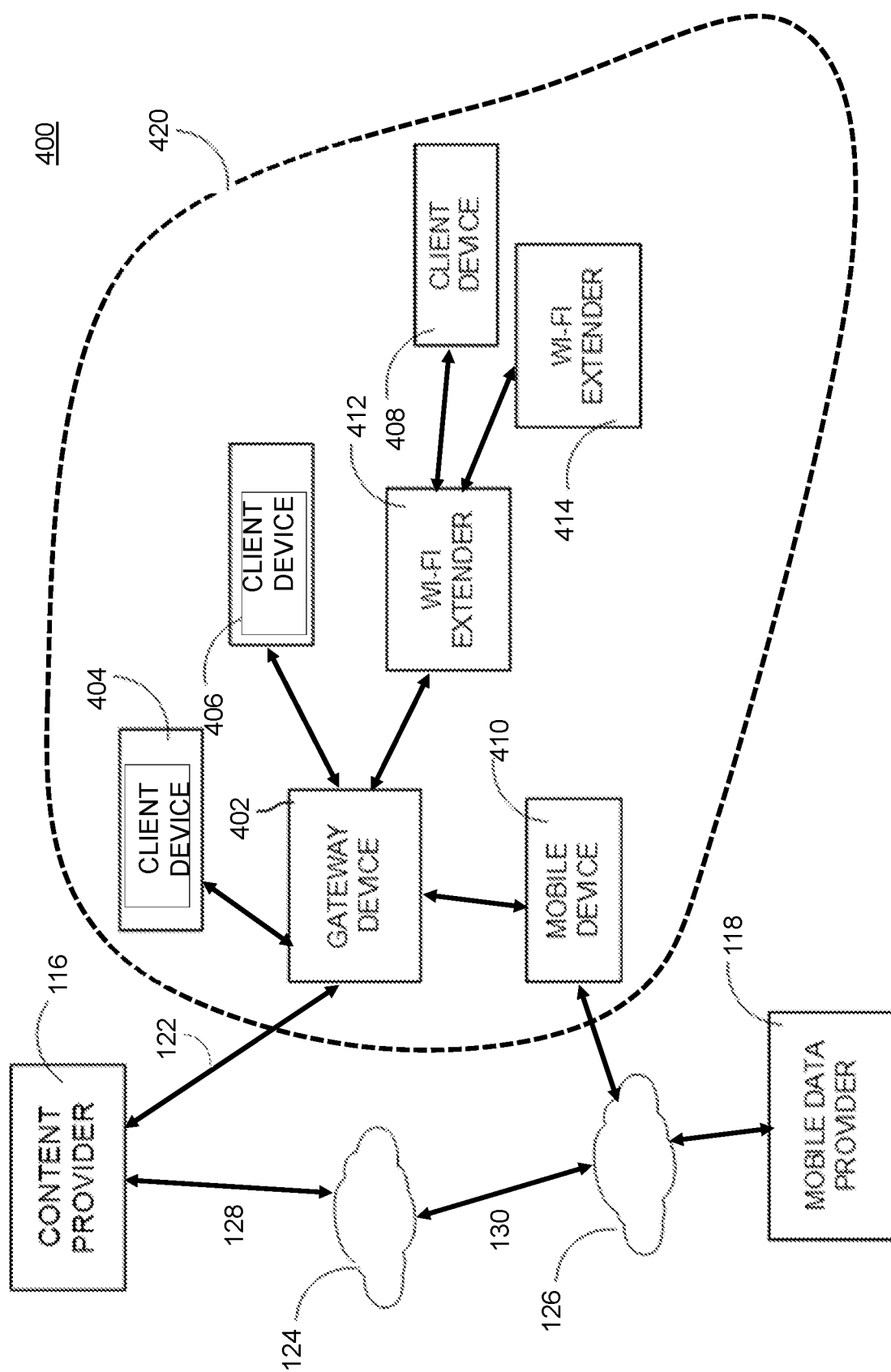
FIG. 4B illustrates the communication system of FIG. 4A at a time $t_3$.

FIG. 4B illustrates communication system 400 at a time $t_3$, in accordance with aspects of the present disclosure.

Figure 5:
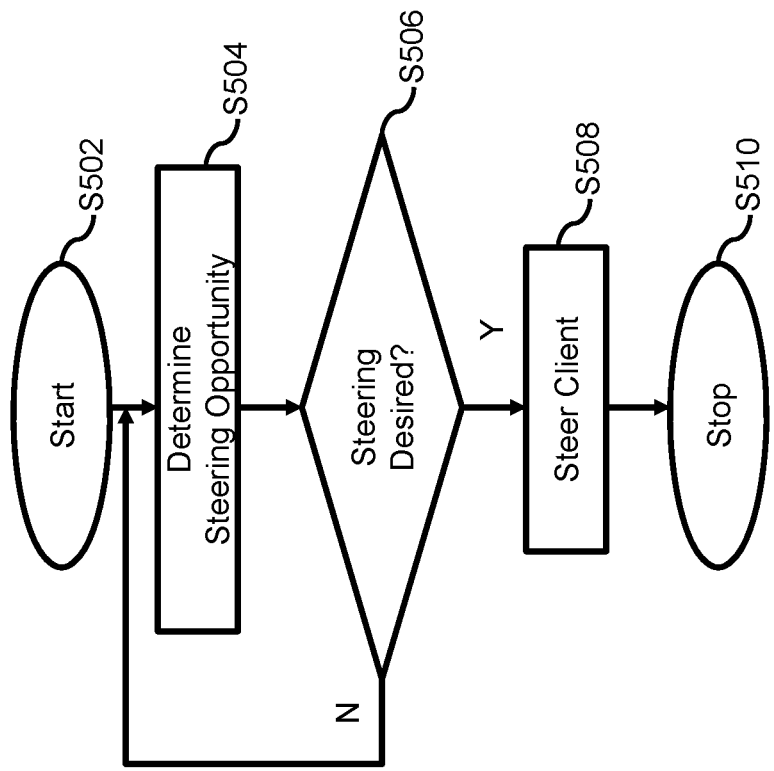
FIG. 5 illustrates a method for steering a client in accordance with aspects of the present disclosure.

FIG. 5 illustrates an algorithm 500 to be executed by a processor for steering a client in accordance with aspects of the present disclosure.

As shown in the figure, algorithm 500 starts (S502), and a steering opportunity is determined (S504). This will be described with additional reference to FIG. 4A, FIG. 6, and FIG. 7A. Consider the situation, as shown in FIG. 4A, client device 408 is associated with Wi-Fi extender 414.

Figure 6:
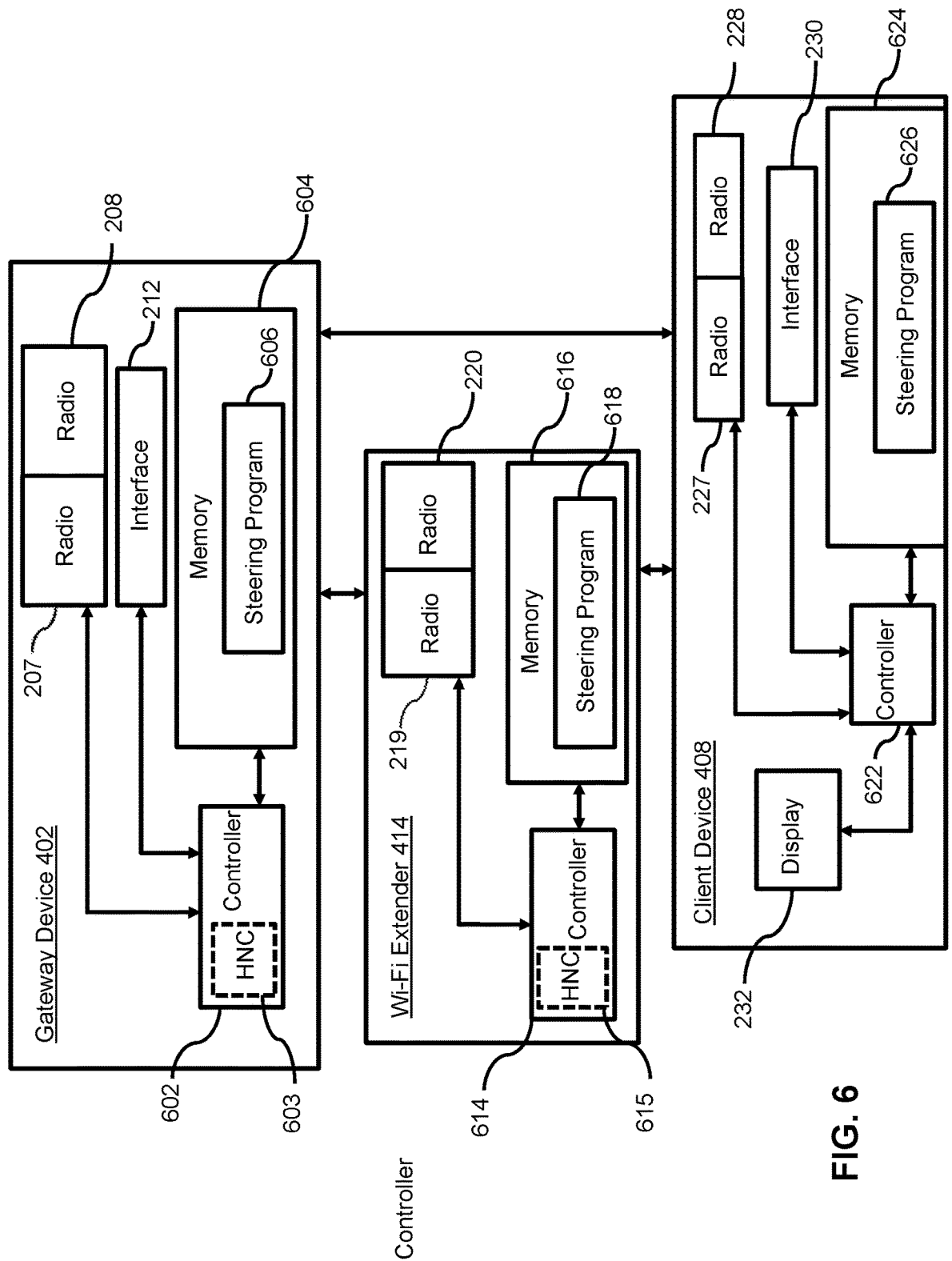
FIG. 6 illustrates an exploded view of the gateway device, a Wi-Fi extender, and a client device of FIGS. 4A-B.

FIG. 6 illustrates an exploded view of gateway device 402, Wi-Fi extender 414, and client device 408 of FIG. 4A and FIG. 4B.

As shown in FIG. 6, gateway device 402 includes: a controller 602, having a HNC 603 disposed therein; a memory 604, which has stored therein a steering program 606; at least one radio, a sample of which is illustrated as radios 207 and 208; and an interface circuit 212.

Steering program 606 includes instructions to be executed by controller 602 to cause gateway device 402 to send a steering instruction based on the steering opportunity from client device 408.

In this example, controller 602, memory 604, radios 207 and 208, and interface circuit 212 are illustrated as individual devices. However, in some embodiments, at least two of controller 602, memory 604, radios 207 and 208, and interface circuit 212 may be combined as a unitary device. Whether as individual devices or as combined devices, controller 602, memory 604, radios 207 and 208, and interface circuit 212 may be implemented as any combination of an apparatus, a system and an integrated circuit. Further, in some embodiments, at least one of controller 602, memory 604 and interface circuit 212 may be implemented as a computer having non-transitory computer-readable media for carrying or having computer-executable instructions or data structures stored thereon.

Controller 602 can include a dedicated control circuit, CPU, microprocessor, etc. Controller 602 controls the circuits of gateway device 402.

Memory 604 can store various programming, and user content, and data. Interface circuit 212 can include one or more connectors, such as RF connectors, or Ethernet connectors, and/or wireless communication circuitry, such as 5G circuitry and one or more antennas.

Interface circuit 212 receives content from content provider 116 (as shown in FIG. 1) by known methods, non-limiting examples of which include terrestrial antenna, satellite dish, wired cable, DSL, optical fibers, or 5G as discussed above. Through interface circuit 212, gateway device 402 receives an input signal, including data and/or audio/video content, from content provider 116 and can send data to content provider 116.

Referencing FIG. 6, Wi-Fi extender 414 includes: a controller 614; a memory 616, which has stored therein a steering program 618; and at least one radio, a sample of which is illustrated as radios 219 and 220. It should be noted that additional Wi-Fi extenders, have similar structure and operation to that of Wi-Fi extender 414. In some cases, Wi-Fi extender 414 or Wi-Fi extender 412 may include an optional HNC. Accordingly as shown in the figure, controller 614 of Wi-Fi extender 414 shows an optional HNC 615 as a dotted box.

As stated previously, HNC 603 resides in controller 602 of gateway device 402. However, as shown in FIG. 6, the HNC of a network may optionally reside in any APD. For example, if an HNC 615 resides Wi-Fi extender 414. If this is the case, then steering program 618 will include instructions to be executed by controller 614 to steer client device 408 at an optimal steering opportunity.

In this example, controller 614, memory 616, and radios 219 and 220 are illustrated as individual devices. However, in some embodiments, at least two of controller 214, memory 616 and radios 219 and 220 may be combined as a unitary device. Further, in some embodiments, at least one of controller 614 and memory 616 may be implemented as a computer having tangible computer-readable media for carrying or having computer-executable instructions or data structures stored thereon.

Controller 614, which can include a dedicated control circuit, CPU, microprocessor, etc., controls the circuits of Wi-Fi extender 414.

Memory 616 can store various programming, and user content, and data.

Client device 408 includes: a controller 622; a memory 624, which has stored therein a steering program 626; and at least one radio, a sample of which is illustrated as a radio 227 and 228; an interface 230 and a display 232.

In this example, controller 622, memory 624, radios 227 and 228, interface 230 and display 232 are illustrated as individual devices. However, in some embodiments, at least two of controller 622, memory 624, radios 227 and 228, interface 230 and display 232 may be combined as a unitary device. Further, in some embodiments, at least one of controller 622 and memory 624 may be implemented as a computer having tangible computer-readable media for carrying or having computer-executable instructions or data structures stored thereon.

Controller 622, which can include a dedicated control circuit, CPU, microprocessor, etc., controls the circuits of client device 408.

Memory 624 can store various programming, and user content, and data including steering program 626.

As will be described in greater detail below, steering program 626 includes instructions to be executed by controller 622 to cause client device 408 to: access external network 124 via content provider 116 to perform a function; determine a steering opportunity for steering client device 408 based on the performance of the function; transmit a steering opportunity signal, based on the determined steering opportunity, to the home network controller; receive a steering request to steer client device 408 at a steering time based on the steering opportunity; and transmit a steering response honoring the received steering request.

As will be described in greater detail below, steering program 626 includes instructions to be executed by controller 622 to cause client device 408 to: receive a poll for the steering opportunity signal from HNC 603; and transmit the steering opportunity signal to HNC 603 in response to receipt of the poll.

As will be described in greater detail below, steering program 626 includes instructions to be executed by controller 622 to cause client device 408 to: receive a steering request signal from HNC 603; and transmit the steering opportunity signal to HNC 603 in response to receipt of the steering request signal.

As will be described in greater detail below, steering program 626 includes instructions to be executed by controller 622 to cause client device 408 to: receive a steering request signal from HNC 603; and transmit the steering opportunity signal to HNC 603 in response to receipt of the steering request signal.

As will be described in greater detail below, steering program 626 includes instructions to be executed by controller 622 to cause client device 408 to: access the external network via the wireless local area network by way of the first APD to receive content, to buffer a portion of the received content into a cache and to play the buffered content as the performance of the function, wherein the steering opportunity is determined based on a time associated with the buffered content.

As will be described in greater detail below, steering program 626 includes instructions to be executed by controller 622 to cause client device 408 to: access the external network via the wireless local area network by way of the first APD to receive content including an advertisement and to play the received content, wherein the steering opportunity is determined based on a time associated with the advertisement.

As will be described in greater detail below, steering program 626 includes instructions to be executed by controller 622 to cause client device 408 to: receive the steering request as a basic service set steering management steering request; receive the basic service set steering management steering request to steer the client device from a first transmission band to a second transmission band. Further, in some embodiments, as will be described in greater detail below, the first transmission band is a transmission band being transmitted by Wi-Fi extender 414, and the second transmission band is a transmission band being transmitted by another APD (not shown).

Steering program 626 includes instructions to be executed by controller 602 to cause gateway device 402 to: permit access for client device 408 to external network 124 via content provider 116 by way of the Wi-Fi extender 414 to perform a function; receive a steering opportunity signal for steering client device 408 based on the performance of a function; transmit a steering request to steer client device 408 at a steering time based on the steering opportunity; receive a steering response honoring the steering request; and transmit a steering instruction to steer client device 408 based on the steering opportunity.

HNC 603 tells Wi-Fi extender 414 that it needs to steer client device 408 to Wi-Fi extender 412. Wi-Fi extender 414 then informs client device 408 that it needs to steer to Wi-Fi extender 412. Client device 408 responds that it will steer. However, it will only steer at a suitable steering opportunity, so that its current task is not interrupted. An example may be when an advertisement is playing while streaming a video. This will be described in greater detail in FIG. 7A.

FIG. 7A illustrates streaming data 302 having a steering opportunity 702 in accordance with aspects of the present disclosure. Referring to the example given above, client device 408 will only steer when it is given a steering opportunity, non-limiting examples of which include: an advertisement playing while streaming content; a data cache that has stored a certain amount of time; and a download that will end in a certain amount of time.

For example, with respect to an advertisement, many devices know when an advertisement is going to appear when streaming content. If client device 408 is streaming content, controller 622 recognizes from the packet identifiers when the advertisement will be provided. Referencing FIG. 7A, controller 622 will see the advertisement, steering opportunity 702, in streaming data 302.

Figure 8A:
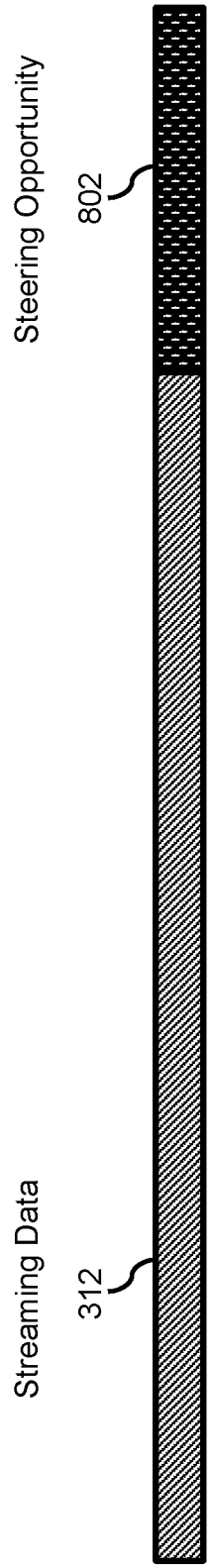
FIG. 8A illustrates streaming data with an indication of an amount of the streaming data being buffered in a cache, represented as a steering opportunity in accordance with aspects of the present disclosure.

FIG. 8A illustrates streaming data 312 with an indication of an amount of streaming data 312 being buffered in a cache, represented as a steering opportunity 802 in accordance with aspects of the present disclosure.

For example, with respect to a data cache, devices will often cache data. If client device 408 is downloading content, it will cache a buffer of data. This data will last a certain amount of time. Referencing FIGS. 6 and 8A, controller 622 will check to see how long the data cache of streaming data 312 will last. If it is long enough for the client device to steer without disrupting streaming data 312, controller 622 will see this data cache as steering opportunity 802 and steer client device 408.

But, HNC 603 of gateway device 402 of FIG. 6 decides that client device 408 should be steered to Wi-Fi extender 412. In accordance with aspects of the present disclosure, client device 408 will inform HNC 603 that it will steer to Wi-Fi extender 412 at a suitable steering opportunity so that its current task is not interrupted. This will be described in greater detail when discussing FIG. 6.

Returning to FIG. 5, after the steering opportunity is determined (S504), it is determined whether steering is desired (S506). For example, in a pull situation, the HNC polls the APD and requests that a client device connected to the APD be steered. If this is the case, a determination as to whether steering is desired (S506) may be skipped, because it is clear that steering is desired. However, in a push situation, the client device broadcasts a steering opportunity signal. In such a situation, the HNC may then determine whether steering is desired, for example, in order to decrease resource strain on any one particular APD.

If it is determined that steering is not desired (N at S506), again a steering opportunity is determined (return to S504) and algorithm 500 continues. If it is determined that steering is desired (Y at S506), then the client is steered (S508). For example, with reference to FIG. 4A and FIG. 6, client device 408 is associated with Wi-Fi extender 414.

For purposes of discussion, let client device 408 be communicating with Wi-Fi extender 414 via radio 228, let Wi-Fi extender 414 be communicating with client device 408 and with gateway device 402 via radio 220, and let gateway device 402 be communicating with Wi-Fi extender 414 via radio 208, wherein each of radio 228, radio 220, and radio 208 is communicating on a 2.4 GHz channel.

Controller 602 of gateway device 402 will send a steering request by way of radio 208 to radio 220 of Wi-Fi extender 414. Wi-Fi extender 414 will then forward the steering request to radio 228 of client device 408. Client device 408 receives the steering request.

For purposes of discussion, presume client device 408 is willing to steer at steering opportunity 702. Accordingly, client device 408 generates a steering opportunity signal that provides information identifying the steering opportunity. Client device 408 sends this steering opportunity signal to radio 220 of Wi-Fi extender 414 via radio 228. Wi-Fi extender 414 then transmits the steering opportunity signal to radio 208 of gateway device 402.

HNC 603 of gateway device 402 then determines the best time to steer client device 408 is in accordance with steering opportunity 702. HNC 603 then sends steering instructions to Wi-Fi extender 414 to steer client device 408 during steering opportunity 702. Wi-Fi extender 414 steers client device 408, represented by steering interruption 704, during steering opportunity 702 to minimize the impact of a loss streaming data 302. FIG. 4B represents the end of this process, where client device 408 is successfully steered to Wi-Fi extender 412.

FIG. 7B illustrates streaming data 302 with a steering interruption 704 occurring during steering opportunity 702. As a result of steering interruption 704, streaming data 302 is broken into data portions 706 and 708. In this example embodiment steering opportunity is an advertisement playing during a streaming movie, which a user is watching on client device 408. Accordingly, client device 408 disconnects from WLAN 420 when it disassociates from Wi-Fi extender 414 at the beginning of the steering operation. However, client device 408 reconnects with WLAN 420 by associating with Wi-Fi extender 412 as shown in FIG. 4B and starts restreaming. Since this interruption, as indicated by steering interruption 704 is while the advertisement is playing, the user will not miss any parts of the movie for which they are watching, thus mitigating the negative aspects of the steering interruption.

It should be noted that if the steering interruption is longer than the steering opportunity, then some of the streaming data, which the user of client device 408 does not want to be interrupted, may nevertheless be interrupted. In some embodiments, if HNC 603 determines that the steering interruption will be longer than the steering opportunity, then HNC 603 may determine that client device 408 is not a candidate for steering.

In the embodiments discussed above with reference to FIGS. 7A-B, the steering opportunity is based on a section of streaming data 302 being different than the rest of streaming data 302, e.g., an advertisement within a streaming movie. However, in some embodiments, the steering opportunity may be based on a buffered amount of the streaming data. This will be described in greater detail with reference to FIGS. 8A-B.

Figure 8B:
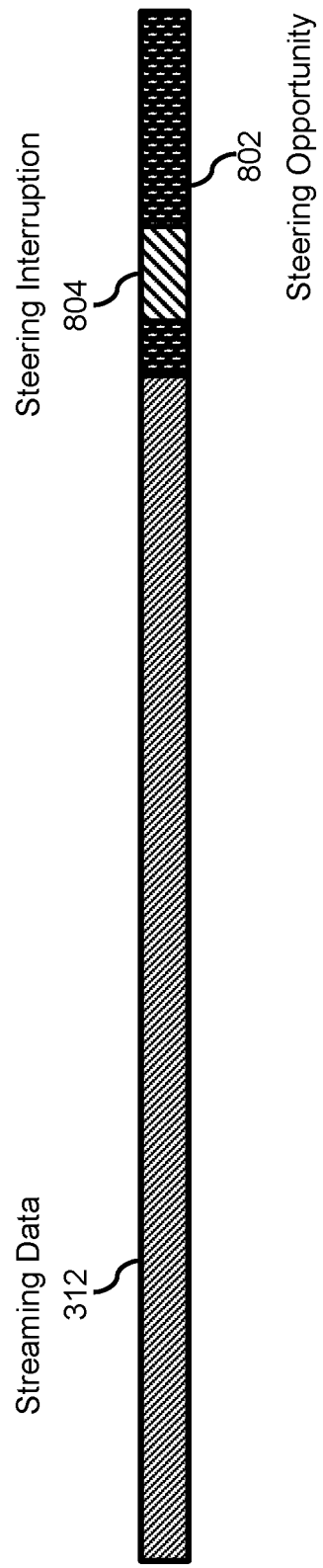
FIG. 8B illustrates the streaming data with an indication of an amount of the streaming data being buffered in the cache, represented as a steering opportunity of FIG. 8A, with a steering interruption disposed therein.

FIG. 8B illustrates the streaming data 312 with an indication of an amount of the streaming data being buffered into a cache (not shown) of client device 408. The amount of streaming data that may be buffered into a cache, for first-in-first-out processing, by client device varies on the size and complexity of the cache. In this non-limiting example embodiment, the amount of data that may be buffered into the cache is represented as a steering opportunity 802. In these embodiments, as long as a steering interruption 804 is disposed within steering opportunity 802, the user will not miss any parts of the movie for which they are watching, thus mitigating the negative aspects of the steering interruption.

It should be noted that if the steering interruption is longer than the amount of data stored in the cache, i.e., if steering interruption 804 were to be longer than steering opportunity 802, then some of the streaming data, which the user of client device 408 does not want to be interrupted, may nevertheless be interrupted. In some embodiments, if HNC 603 determines that the steering interruption will be longer than the steering opportunity, then HNC 603 may determine that client device 408 is not a candidate for steering.

Still further, in other embodiments, a steering opportunity may be determined by prioritizing types of functions that may performed by client device 408. For example, online banking may have a higher priority that perusing an online social network. Accordingly, if the user of client device 408 is performing online banking through client device 408, then a steering opportunity may be determined to be after termination of the online banking session as the online banking function is of a higher priority. On the contrary, a steering opportunity may be determined to by most anytime while perusing an online social network as such a function has a lower priority.

Returning to FIG. 5, after the client is steered (S508), algorithm 500 stops (S510).

To summarize, in conventional steering systems, the client devices may be steered regardless of what the client devices are doing, wherein sometimes tasks may be interrupted.

However, in accordance with aspects of the present disclosure a client device provides information related to a steering opportunity, wherein a steering interruption may occur during the steering opportunity to avoid interrupting a task.

The processes disclosed above constitute algorithms that can be effected by software, applications (apps, or mobile apps), or computer programs. The software, applications, computer programs can be stored on a non-transitory computer-readable medium for causing a computer, such as the one or more processors, to execute the processes described herein and shown in the drawing figures.

The foregoing description of various preferred embodiments have been presented for purposes of illustration and description. It is not intended to be exhaustive or to limit the present disclosure to the precise forms disclosed, and obviously many modifications and variations are possible in light of the above teaching. The example embodiments, as described above, were chosen and described in order to best explain the principles of the present disclosure and its practical application to thereby enable others skilled in the art to best utilize the present disclosure in various embodiments and with various modifications as are suited to the particular use contemplated. It is intended that the scope of the present disclosure be defined by the claims appended hereto.

What is claimed is:

1. A client device for use with a first access point device, a second access point device and a home network controller device, the first access point device and the home network controller device, the first access point device and the home network contoller device providing a wireless local area network for the client device and providing access to an external network to the client device, the client device comprising:
   a memory; and
   a processor configured to execute instructions stored on the memory to cause the client device to:
      access an external network via the wireless local area network by way of the first access point device within the wireless local area network to receive content and to buffer a portion of the received content into a cache as performance of a function;
      receive a poll for a steering opportunity signal from the home network controller device;
      determine a steering opportunity for steering the client device based on a time associated with the buffered content;
      transmit, in response to the receiving the poll, the steering opportunity signal, based on the steering opportunity, to a home network controller device within the wireless local area network;
      receive a steering request to steer the client device at a steering time based on the steering opportunity;
      transmit a steering response honoring the received steering request; and
      steering to the second access point device at the steering time based on the steering request.

2. The client device of claim 1, wherein the steering opportunity provides information identifying the steering opportunity.

3. The client device of claim 1,
   wherein the processor is further configured to execute instructions stored on the memory to cause the client device to receive a steering request signal from the home network controller device, and
   wherein the processor is further configured to execute instructions stored on the memory to cause the client device to transmit the steering opportunity signal to the home network controller device in response to receipt of the steering request signal.

4. The client device of claim 1, wherein determining the steering opportunity is based on prioritizing types of functions performed by the client device.

5. The client device of claim 1, wherein the processor is further configured to execute instructions stored on the memory to cause the client device to:
   access the external network via the wireless local area network by way of the first access point device to receive content including an advertisement and to play the received content,
   wherein the steering opportunity is determined based on a time associated with the advertisement.

6. The client device of claim 1,
   wherein the processor is further configured to execute instructions stored on the memory to cause the client device to receive the steering request as a basic service set steering management steering request, and wherein the processor is further configured to execute instructions stored on the memory to cause the client device to receive the basic service set steering management steering request to steer the client device from a first transmission band to a second transmission band.

7. The client device of claim 6, wherein the first transmission band is a transmission band being transmitted by the first access point device, and wherein the second transmission band is a transmission band being transmitted by the second access point device.

8. A method of using a client device with a first access point device and a home network controller device, the first access point device, a second access point device and the home network controller device providing a wireless local area network for the client device and providing access to an external network to the client device, the method comprising:

accessing an external network via the wireless local area network by way of the first access point device within the wireless local area network to receive content and to buffer a portion of the received content into a cache as performance of a function;

determining a steering opportunity for steering the client device based on a time associated with the buffered content;

transmitting, in response to the receiving the poll, the steering opportunity signal, based on the steering opportunity, to a home network controller device within the wireless local area network;

receiving the steering request to steer the client device at a steering time based on the steering opportunity;

transmitting a steering response honoring the received steering request; and steering to the second access point device at the steering time based on the steering request.

9. The method of claim 8, wherein the steering opportunity provides information identifying the steering opportunity.

10. The method of claim 8, further comprising:

receiving a steering request signal from the home network controller device, wherein the transmitting the steering opportunity signal comprises transmitting the steering opportunity signal, based on the determined steering opportunity, to the home network controller device in response to receipt of the steering request signal.

11. The method of claim 8, wherein determining the steering opportunity is based on prioritizing types of functions performed by the client device.

12. The method of claim 8, further comprising:

accessing, via the wireless local area network by way of the first access point device, the external network to receive content including an advertisement; and playing the received content, wherein the determining the steering opportunity comprises determining the steering opportunity based on a time associated with the advertisement.

13. The method of claim 8, wherein the receiving the steering request comprises receiving the steering request as a basic service set steering management steering request, and wherein the receiving the steering request as a basic service set steering management steering request comprises receiving the basic service set steering management steering request to steer the client device from a first transmission band to a second transmission band.

14. The method of claim 13, wherein the first transmission band is a transmission band being transmitted by the first access point device, and wherein the second transmission band is a transmission band being transmitted by second access point device.

15. A non-transitory, computer-readable media having computer-readable instructions stored thereon, the computer-readable instructions being capable of being read by a client device for use with a first access point device, a second access point device and a home network contoller device, the first access point device and the home network controller device providing a wireless local area network for the client device and providing access to an external network to the client device, wherein the computer-readable instructions are capable of instructing the client device to perform the method comprising:

accessing an external network via the wireless local area network by way of a first access point device within the wireless local area network to receive content and to buffer a portion of the received content into a cache as performance of a function;

receive a poll for a steering opportunity signal from the home network controller device;

determining a steering opportunity for steering the client device based on a time associated with the buffered content;

transmitting, in response to the receiving the poll, the steering opportunity signal, based on the determined steering opportunity, to a home network controller device within the wireless local area network;

receiving a steering request to steer the client device at a steering time based on the steering opportunity;

transmitting a steering response honoring the received steering request; and steering to the second access point device at the steering time based on the steering request.

16. The non-transitory, computer-readable media of claim 15, wherein the steering opportunity provides information identifying the steering opportunity.

17. The non-transitory, computer-readable media of claim 15, wherein the computer-readable instructions when executed by the processor cause the client device to perform the method further comprising:

receiving a steering request signal from the home network controller device, wherein the transmitting the steering opportunity signal comprises transmitting the steering opportunity signal, based on the determined steering opportunity, to the home network controller device in response to receipt of the steering request signal.

18. The non-transitory, computer-readable media of claim 15, wherein determining the steering opportunity is based on prioritizing types of functions performed by the client device.

19. The non-transitory, computer-readable media of claim 15, wherein the computer-readable instructions when executed by the processor cause the client device to perform the method further comprising:

accessing via the wireless local area network by way of the first access point device, the external network to receive content including an advertisement; and playing the received content,
wherein the determining the steering opportunity comprises determining the steering opportunity based on a time associated with the advertisement.

20. The non-transitory, computer-readable media of claim 15, wherein the computer-readable instructions when executed by the processor cause the client device to perform the method
wherein the receiving the steering request comprises receiving the steering request as a basic service set steering management steering request, and
wherein the receiving the steering request as a basic service set steering management steering request comprises receiving the basic service set steering management steering request to steer the client device from a first transmission band to a second transmission band.

21. The non-transitory, computer-readable media of claim 20,
wherein the computer-readable instructions when executed by the processor cause the client device to perform the method wherein the first transmission band is a transmission band being transmitted by the first access point device, and
wherein the second transmission band is a transmission band being transmitted by the second access point device.

22. A method of using a home network controller device with a first access point device and a client device, the first access point device, a second access point device and the client device being included within a wireless local area network, the method comprising:
permitting a client device within the wireless local area network to access an external network via the wireless local area network by way of a first access point device within the wireless local area network to receive content and to buffer a portion of the received content as performance of a function;
transmitting, to the client device by way of the first access point device, a poll for a steering opportunity signal;
receiving, from the client device by way of the first access point device, in response to the poll, a steering opportunity signal for steering the client device based on a steering opportunity determined by the client device, wherein the steering opportunity is based on the buffered content by the client device;
transmitting, to the client device by way of the first access point device, a steering request to steer the client device at a steering time based on the steering opportunity;
receiving, from the client device by way of the first access point device, a steering response honoring the steering request; and
transmitting, to the client device by way of the first access point device, a steering instruction to cause the client device to steer to the second access point device at the steering time based on the steering response.

23. The method of claim 22, wherein the steering opportunity provides information identifying the steering opportunity.

24. The method of claim 22, further comprising:
transmitting, to the client device by way of the first access point device, a steering request signal,
wherein the receiving the steering opportunity signal comprises receiving the steering opportunity signal, based on the determined steering opportunity, from the client device in response to receipt of the steering request signal.

25. The method of claim 22,
wherein the transmitting the steering request comprises transmitting the steering request as a basic service set steering management steering request, and
wherein the transmitting the steering request as a basic service set steering management steering request comprises transmitting the basic service set steering management steering request to steer the client device from a first transmission band to a second transmission band.

26. The method of claim 25, wherein the first transmission band is a transmission band being transmitted by the first access point device, and wherein the second transmission band is a transmission band being transmitted by the second access point device.

27. A home network controller device for use with a first access point device and a client device, the first access point device, a second access point device and the client device being included within a wireless local area network, the home network controller device comprising:
a memory; and
a processor configured to execute instructions stored on the memory to cause the home network device to:
permit access for a client device within the wireless local area network to the external network via the wireless local area network by way of the first access point device within the wireless local area network to receive content and to buffer a portion of the received content as performance of a function;
transmit, to the client device by way of the first access point device, a poll for a steering opportunity signal;
receive, from the client device by way of the first access point device, in response to the poll, a steering opportunity signal for steering the client device based on a steering opportunity determined by the client device, wherein the steering opportunity is based on the buffered content by the client device;
transmit, to the client device by way of the first access point device, a steering request to steer the client device at a steering time based on the steering opportunity;
receive, from the client device by way of the first access point device, a steering response honoring the received steering request; and
transmit, to the client device by way of the first access point device, a steering instruction to cause the client device to steer to the second access point device at the steering time based on the steering opportunity.

28. The home network controller device of claim 27, wherein the steering opportunity provides information identifying the steering opportunity.

29. The home network controller device of claim 27, wherein the processor is further configured to execute instructions stored on the memory to cause the home network controller device to:
transmit, to the client device by way of the first access point device, a steering request signal; and
receive the steering opportunity signal, based on the determined steering opportunity, from the client device in response to receipt of the steering request signal.

30. The home network controller device of claim 27,
wherein the processor is further configured to execute instructions stored on the memory to cause the home network controller device to transmit the steering request as a basic service set steering management steering request, and wherein the processor is further configured to execute instructions stored on the memory to cause the home network controller device to transmit the basic service set steering management steering request to steer the client device from a first transmission band to a second transmission band.

31. The home network controller device of claim 30, wherein the first transmission band is a transmission band being transmitted by the first access point device, and wherein the second transmission band is a transmission band being transmitted by the second access point device.

\* \* \* \* \*